UNITED STATES PATENT OFFICE.

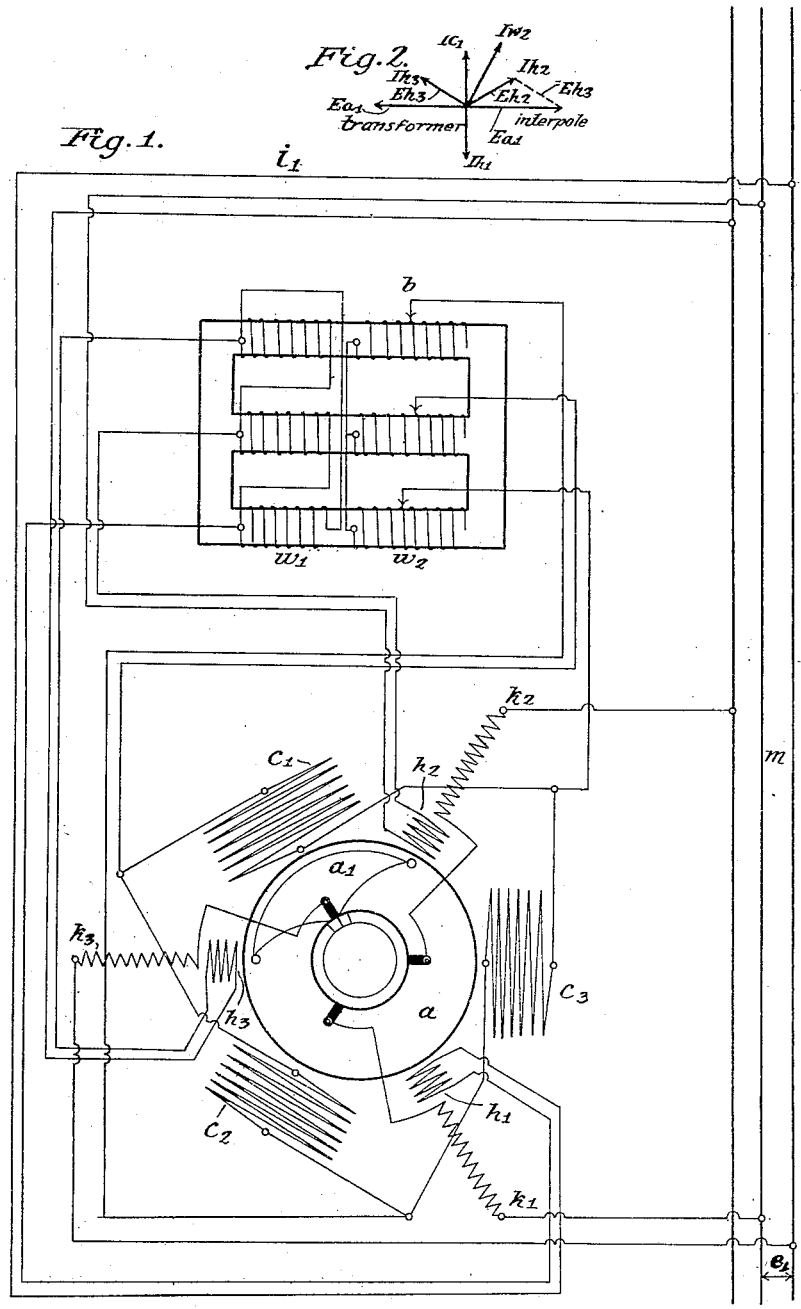

HEINRICH MEYER-DELIUS, OF BADEN, SWITZERLAND, ASSIGNOR, BY MESNE ASSIGNMENTS, TO GENERAL ELECTRIC COMPANY, A CORPORATION OF NEW YORK.

ALTERNATING-CURRENT COMMUTATOR MACHINERY.

1,157,948.  Specification of Letters Patent.  Patented Oct. 26, 1915.

Application filed June 13, 1910. Serial No. 566,624.

*To all whom it may concern:*

Be it known that I, Dr. HEINRICH MEYER-DELIUS, a subject of the German Emperor, and residing at Baden, Switzerland, have invented certain new and useful Improvements in and Relating to Alternating-Current Commutator Machinery, of which the following is a specification.

My invention relates to alternating current commutator machinery, and particularly to means for completely compensating for the transformer electromotive force in a shunt or separately excited machine, which may be either single phase or polyphase. In such machines, as is well known, one component of the electromotive force set up in the machine is due to transformer action; that is, to the alternate introduction and removal of the field flux. This electromotive force is 90° behind the flux in phase, and acts along the axis of the field. One of the effects of this transformer action is to cause sparking at the commutator, since it sets up a potential in those windings of the armature which are at any instant short circuited by the brushes. This potential, as is obvious, is directly proportional in magnitude to the flux and frequency and is independent of the speed of rotation. In order to compensate for this potential, it will be clear that it is necessary to provide means for setting up in the short circuited windings a potential equal and opposite to that set up due to the transformer action. One method of accomplishing this result is to provide interpoles acting along a plane normal to the axis of the short circuited windings and of such a strength as to produce the correct compensating potential. In using such interpoles it will be clear that the potential set up thereby will be directly proportional to the flux of the interpoles and to the speed of rotation. Since the potential set up due to the transformer action varies with the main flux and the frequency, and the potential set up by the interpoles varies with the flux of the interpoles and the speed of rotation, it is clear that for any variation of either the main flux, the frequency or the speed, that a variation of the flux of the interpole will be required in order to completely compensate for the transformer action under all conditions. That is to say, if we can provide an arrangement wherein the flux of the interpole will vary directly with the main flux and the frequency and inversely with the speed of rotation, we will have a complete compensation for the potential set up in the short circuited windings due to the transformer action. Since the flux set up by the interpole is directly proportional to the current producing it, we can say that for complete compensation this current $i_h$ must be proportional to $$\frac{fc}{n},$$

where $f$ is the main flux, $c$ is the frequency, and $n$ is the speed of rotation.

The object of my invention is to provide an arrangement for procuring this result in a shunt wound commutator machine of any number of phases.

Let us now consider a commutator machine having its shunt field winding excited from the secondary terminals of a transformer. From the energy equation for a transformer $$i_1 : i_2 :: e_2 : e_1,$$

or—

$$i_1 = \frac{i_2 e_2}{e_1}$$

where $i_1$, $i_2$ and $e_1$, $e_2$ are the current and potential, respectively, of the primary and secondary. Since this equation holds true for both an auto transformer and a two coil transformer, it is immaterial which is used, and any reference to a primary or a secondary does not indicate a limitation to the two coil form. Now $e_1$ is proportional to and practically equal to $fn$; that is, the line voltage is proportional to and practically equal to the back electromotive force. Then $i_2$ is proportional to $f$, neglecting saturation effects, and $e_2$ is proportional to $fc$; that is, there is a definite field corresponding to the exciting voltage, which field depends only on the periodicity.

Substituting these values in the formula $$i_1 = \frac{i_2 e_2}{e_1}$$

we have $i_1$ is proportional to $$\frac{f.f.c}{f.n};$$

that is, $i_1$ is proportional to $$\frac{fc}{n}.$$

This means that if the shunt field of a commutator machine be excited by current from the secondary of a transformer, the current which will flow in the primary of the transformer will be directly proportional to the main field and the frequency and inversely proportional to the speed of rotation. We have already seen that in order to compensate completely for the transformer action on the short circuited windings by means of interpoles, that such interpoles must be excited by a current $i_h$ proportional to $$\frac{fc}{n}.$$

Hence, it follows that if we excite the interpole windings by a current proportional to the current supplied to the primary of a transformer, the secondary of which excites the shunt field of a commutator machine, such current will vary in magnitude so as to completely compensate for the transformer action for all possible variations of the applied excitation. From the above consideration it is clear that by this means I obtain a current having the desired characteristics for compensating as described, and from a practical standpoint it is only necessary to give this current the correct phase and value.

As before stated, the phase of the potential set up due to the transformer action is 90° behind that of the flux of the main field. In a single phase machine, this flux is in phase with the current in the secondary of the exciting transformer. The current of the primary is, moreover, 180 degrees displaced from that of the secondary. Hence, in order that a current proportional to that of the primary may be used to compensate the transformer action, it will be clear that such current must be shifted through an angle of 90°. Any known or desired means may be employed for performing this function, as, for example, the use of inductive resistances. In the case of a polyphase machine, the main field current will still be 180° out of phase with the current in the corresponding interpole winding, and here the correct phase relation for carrying out my invention may be obtained by the combination of phases in a manner to be later more fully explained. The matter of the correct phase relation of the current in an interpole winding is, however, old and well known in the art, and my invention is concerned especially with the problem of correctly quantitatively compensating the transformer electromotive force for all possible settings of the transformer taps.

In the drawing, Figure 1 shows my invention as applied to a three-phase shunt excited commutator machine, and in connection therewith one means which I may use for securing the required phase relations is illustrated. Fig. 2 is a vector diagram showing the phase relations of various quantities obtained in the operation of the arrangement shown in Fig. 1.

In the form shown, the machine $a$ is excited by the field coils $c_1$, $c_2$, $c_3$ fed from the secondary winding $w_2$ of the transformer $b$, the primary $w_1$ of which receives current from the mains $m$. The armature has its brushes connected directly to the mains $m$, such connections including the usual compensating windings $k_1$, $k_2$, $k_3$ for compensating for armature reactions, as is known in the art. My interpole windings $h_1$, $h_2$, $h_3$ are illustrated as receiving current directly in series with the mains leading to the primary of the transformer. In the present instance, I obtain the proper phase relations by connecting the primary of my transformer in delta, and the secondary in Y, the three exciting coils $c_1$, $c_2$, $c_3$ being connected in delta.

Having previously shown that the transformer electromotive force is quantitatively correctly compensated by my invention, it only remains to show that the correct phase relation may be obtained in a well known manner, as by a combination of phases in the polyphase machine illustrated. Considering, by way of example, the armature coil $a_1$ shown as being short circuited by one of the brushes, the conductors of which lie under the interpole windings $h_2$ and $h_3$. The interpole windings $h_1$, $h_2$ and $h_3$ are here shown as connected in series with the mains leading to the primary of the three-phase transformer. The currents in said windings will accordingly have a relative phase displacement of 120°, as indicated by the vectors $Ih_1$, $Ih_2$ and $Ih_3$ in Fig. 2. Now, the fluxes produced by these windings will be in phase with the currents therein. Further, the potentials (indicated as $Eh_2$ and $Eh_3$) set up by the rotation of the conductors of the armature coil $a_1$ through the fluxes produced by the interpoles $h_2$ and $h_3$ will be in phase with the currents $Ih_2$ and $Ih_3$, and the resultant electromotive force due to the action of the interpoles on this coil will be represented by the vector $Ea_1$ interpole, which represents the vectorial difference between $Eh_2$ and $Eh_3$. Evidently, the line currents on the primary side of the transformer are identical with the currents in the interpole windings, and will be represented by the same vectors. Now, it is well understood that with the delta-star connection of a three-phase transformer, the line current on the secondary side lags 150° behind the line current on the primary side. The vector $Iw_2$ will, therefore, represent the secondary current corresponding to the primary line current represented by $Ih_1$. This secondary current will divide into two components each diverging 30° because of the delta connection of the field coils $c_1, c_2, c_3$. The vector $Ic_1$ will, therefore, correctly indicate the phase relation of the current in the exciting coil $c_1$. But the flux in this coil will be in phase with the current, and consequently the voltage induced by the transformer action of this flux on the armature coil $a_1$ will lag 90° behind $Ic_1$ and be represented by $Ea_1$ transformer. Evidently, this is 180° out of phase with $Ea_1$ interpole. Consequently, it will be seen that I have shown that the correct phase relation between the interpole current and the main field current may be obtained by this well known arrangement of a delta-star connected transformer in conjunction with the delta connection of the exciting field coils. Since the currents in the interpole and field windings are exciting currents, and hence wattless, this phase relation, once determined, continues for all conditions of operation.

Although I have herein illustrated and described my invention as applied to a three-phase machine in conjunction with a transformer of the two coil type, I do not desire to be limited to this exact arrangement, but seek to cover in the appended claims all modifications which fall within the scope and spirit of my invention.

I claim—

1. In combination, an alternating current commutator machine, a transformer, a shunt field winding on said machine excited from the secondary of said transformer, and an interpole winding on said machine excited with a current proportional to the current supplied to the primary winding of said transformer.

2. In combination, an alternating current commutator machine, a transformer, a shunt field winding on said machine excited from the secondary of said transformer, and an interpole winding on said machine connected in series with the mains leading to the primary of said transformer.

3. In combination, a dynamo electric machine having a commuted winding, a transformer, an exciting winding on said machine connected to the secondary of said transformer, a compensating winding on said machine in series with said commuted winding, and an interpole winding excited with a current proportional to the current supplied to the primary of said transformer.

4. In combination, a dynamo electric machine having a commuted winding, a transformer, a shunt field winding on said machine excited from the secondary of said transformer, an interpole winding on said machine connected in series with the mains leading to the primary of said transformer, and a compensating winding on said machine in series with said commuted winding.

5. In combination, a three-phase dynamo electric machine having a commuted winding, a three-phase transformer, the primary windings of which are connected in delta and the secondary windings of which are connected in star, a shunt exciting winding on said machine connected in delta to the secondary of said transformer, main compensating windings on said machine in series with the said commuted winding, and interpole windings on said machine connected in series with the mains leading to the primary of said transformer.

In testimony whereof I affix my signature in presence of two witnesses.

DR. HEINRICH MEYER-DELIUS.

Witnesses:
CARL GUBLER,
AUGUST RÜEGG.